United States Patent [19]
Huszar

[11] 3,806,149
[45] Apr. 23, 1974

[54] DRAGSTER RACING CHASSIS

[76] Inventor: Frank Huszar, 18422 Oxhard, Tarzana, Calif. 91356

[22] Filed: Sept. 11, 1972

[21] Appl. No.: 288,112

[52] U.S. Cl.......... 280/106.5, 296/28 J, 180/73 TL
[51] Int. Cl............................................ B62d 21/00
[58] Field of Search................ 280/106.5; 296/28 J; 180/73 TL, 73 TT

[56] References Cited
UNITED STATES PATENTS

| | | |
|---|---|---|
| 1,927,032 | 9/1933 | Heil............................. 280/106.5 R |
| 2,097,309 | 10/1937 | Sanders....................... 280/106.5 R |
| 2,248,921 | 7/1941 | Casner......................... 280/106.5 R |

*Primary Examiner*—Philip Goodman
*Attorney, Agent, or Firm*—Robert O. Richardson

[57] ABSTRACT

A racing chassis having a subframe housing the engine and rear end suspended inside the main frame rails. The subframe is spring-mounted in the front and pivotally mounted to the main frame at the rear at a point below and forward of the rear axle. The rear axle is also detachable from the subframe.

4 Claims, 4 Drawing Figures

3,806,149

DRAGSTER RACING CHASSIS

BACKGROUND OF THE INVENTION

Dragster racing calls for high acceleration over a quarter-mile strip in which the cars achieve a velocity in excess of 200 miles per hour. This requires a sudden transfer of power from the engine to the wheels. When this occurs the engine tends to tilt upwardly, hence relieving traction on the wheels. Moreover, there is a strain on the connections between the engine and the frame to which it is attached. Adding more connections for reinforcement lengthens the time for, and increases the difficulty of, removal of the engine.

SUMMARY OF THE PRESENT INVENTION

The dragster racing chassis of the present invention is of the rear engine type having an engine subframe assembly suspended in such a manner as to permit varying degrees of adjustment. This subframe is connected to the main frame at a pivot point below and forward of the axle for the rear wheels. The subframe fits within the main frame and connects to it at the subframe forward end just forward of the engine by a spring mounting. The spring is similar in size to an average valve spring and its tension may be adjusted to varying strip conditions, eliminating the need for additional weight bars on the front of the car. The differential housing and axle connects to the main frame through the subframe from which it is readily detachable.

The subframe concept allows for engine and chassis torque and actually harnesses them in a usable manner. Cradled inside the main frame, the subframe and engine actually rocks or twists while the main frame remains steady. By eliminating flexing of the main chassis from engine torque, maximum torque can be provided. As the engine pivots up during acceleration, its weight is transferred to the rear wheels. Instead of the torque forces trying to rip the engine out of the car, the subframe containing the engine will pivot at the rear wheel and the amount of travel is controlled by spring pressure at the front of the subframe.

The subframe can be easily removed from the chassis to facilitate major engine repair. A spare subframe complete with engine permits fast engine changes during competition. The subframe and rear wheels provide an engine cradle and trailer to permit its movement into small repair facilities and for storage. The axle and rear wheels also may be removed from the subframe and engine.

DETAILED DESCRIPTION OF THE INVENTION

Figure 1:
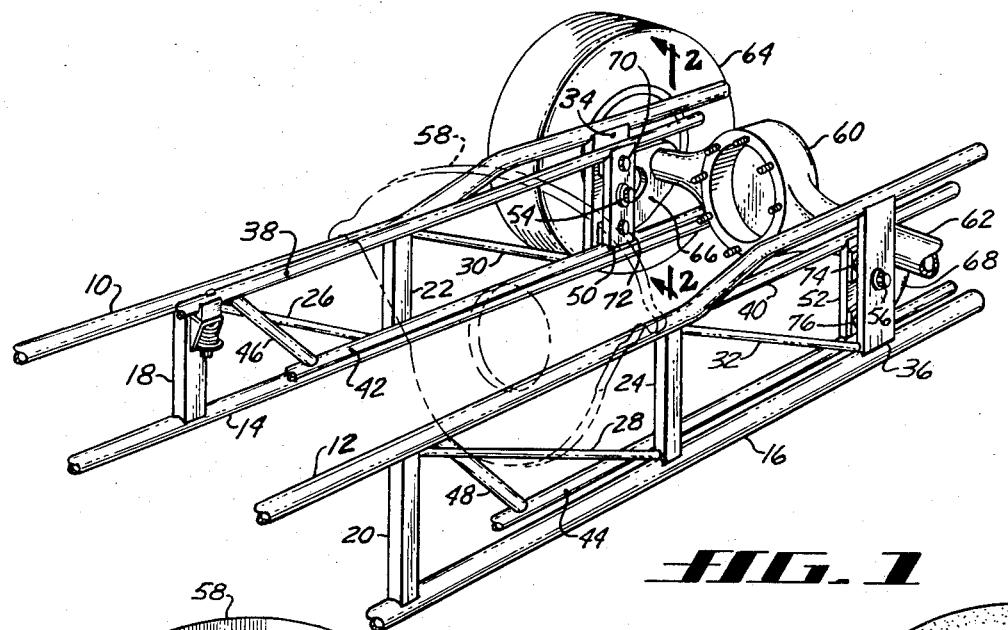
FIG. 1 is a partial view of the dragster racing chassis.

Referring now to FIG. 1 there is shown a main frame having top rails 10, 12 and bottom rails 14, 16. Spacer bars 18, 20, 22 and 24 are welded between the top and bottom rails. Brace rods 26, 28, 30 and 32 are also welded between the rails for strength and rigidity. Connecting plates 34 and 36 also extend between the rails. Although the main frame extends from 15 to 30 feet in length, only that portion is shown which connects with the subframe.

The subframe consists of upper and lower rails 38, 40, 42 and 44 connected by front spacer bars 46, 48 and connecting plates 50, 52. Connecting plate 34 on the main frame and connecting plate 50 on the subframe are pivotally connected by a bolt 54. Similarly, connecting plates 36 and 52 are pivotally connected by bolt 56. An engine mounting plate 58, shown in phantom lines, will be described in connection with FIG. 2.

The rear end, consisting of the differential housing 60, axle 62 and rear wheels 64, are connected to the main frame through the subframe. For this purpose a pair of brackets 66, 68 are welded to axle 62 and extend forwardly to be bolted to the connecting plates 50 and 52 of the subframe. Bolts 70 and 72 connect the forward ends of bracket 66 to connecting plate 50 and the forward ends of bracket 68 are connected to connecting plate 52 by bolts 74 and 76. Between the forward ends of brackets 66, 68 the brackets are recessed to permit partial encirclement about the pivotal connections 54 and 56 of the subframe with the main frame. This can best be seen in FIG. 2.

Figures 2, 3:
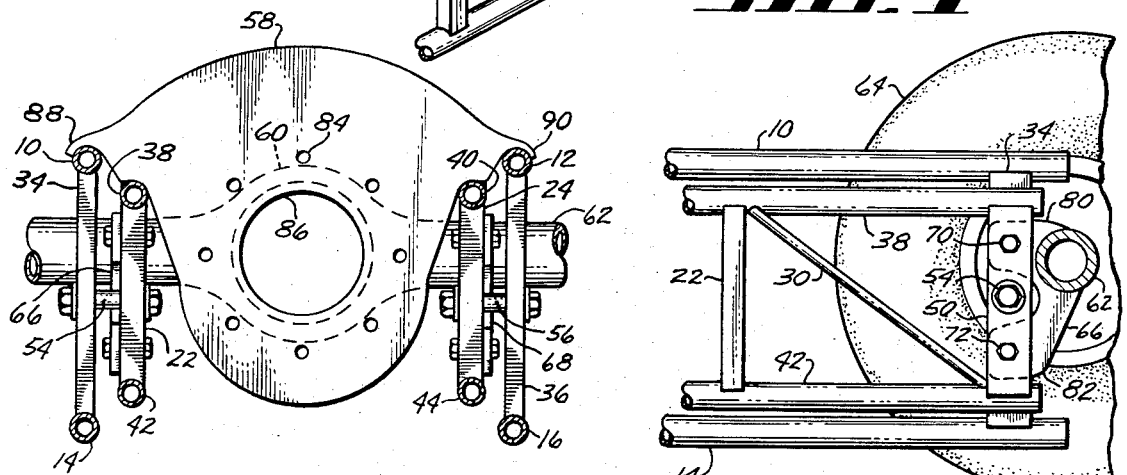
FIG. 2 is a sectional view taken along the line 2-2 of FIG. 1.
FIG. 3 is a sectional view facing the rear of the chassis.
Figure 4:
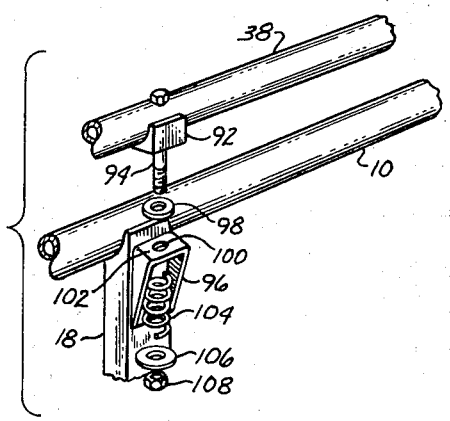
FIG. 4 is an exploded view of the tension adjusting spring mounting.

In FIG. 2 there is shown the rear portion of top rail 10 and bottom rail 14 of the main frame connected by connecting plate 34. Also shown is the rear portion of upper rail 38 and lower rail 42 of the subframe connected by spacer bar 22, brace rod 30 and connecting plate 50. Also shown is rear wheel 64, axle 62 and bracket 66. Bolt 54 connects the connecting plates 50 and 34 on the two frames. The upper and lower forward ends 80, 82 of U-shaped bracket 66 are connected to connecting plate 50 by bolts 70, 72.

FIG. 3 is a sectional view facing the rear. Here it can be seen that the side sections of the subframe are positioned between the side sections of the main frame and are pivotally connected to them by bolts 54 and 56. Just forwardly of spacer bars 22, 24 and welded to upper rails 38, 40 of the subframe is the engine mounting plate 58. The rear end of the engine, not shown, abuts the front face and a drive shaft connector, not shown, abuts the rear face of plate 58 and are fastened to it by bolts, not shown, through apertures 84. Central opening 86 permits passage of the driveshaft from the engine to the differential housing 60 on rear axle 62. Plate 58 has outwardly protruding lips 88, 90 which rest upon upper rails 10, 12 of the main frame.

The front end of the subframe is fastened to the main frame by means of a mounting pad 92 and bolt 94 on the forward end of upper rail 38 fastened to a support bracket 96 welded to spacer bar 18 just below top rail 10 of the main frame. A rubber grommet 98 is positioned between mounting pad 92 and support bracket 96 to prevent rattle. Bolt 94 extends down through opening 100 in the top 102 of support bracket 96. A spring or tension adjustor 104 fits over the bolt and against the undersurface of the top 102. A washer 106 and nut 108 hold the spring 104 under desired tension.

Having thus described an illustrative embodiment of the present invention, it is to be understood that modifications thereof will become apparent to those skilled in the art and it is to be understood that these devia- tions are to be construed as part of the present invention.

What is claimed is:

1. An auto chassis comprising:
   a main frame having top and bottom rails interconnected with spacer bars and connecting plates,
   a subframe consisting of upper and lower rails connected by front spacer bars and rear connecting plates,
   pivot means connecting said plates on said main frame with said plates on said subframe,
   resilient means for connecting the front end of said subframe to said main frame, and
   an engine mounting plate on said subframe forwardly of said connecting plates,
   said engine mounting plate having outwardly protruding lips resting upon said upper rails of said main frame.

2. An auto chassis comprising:
   a main frame having top and bottom rails interconnected with spacer bars and connecting plates,
   a subframe consisting of upper and lower rails connected by front spacer bars and rear connecting plates,
   pivot means connecting said plates on said main frame with said plates on said subframe,
   resilient means for connecting the front end of said subframe to said main frame, and
   said resilient means including a compression spring, a bracket on said main frame, a bolt passing through said subframe upper rail and through said bracket, and a nut and washer on said bolt, said compression spring being positioned over said bolt and between said washer and said bracket.

3. An auto chassis comprising:
   a main frame having top and bottom rails interconnected with spacer bars and connecting plates,
   a subframe consisting of upper and lower rails connected by front spacer bars and rear connecting plates,
   pivot means connecting said plates on said main frame with said plates on said subframe,
   resilient means for connecting the front end of said subframe to said main frame, and
   a rear wheel axle,
   forwardly extending brackets on said axle, and
   means connecting said brackets to said rear connecting plates of said subframe,
   said pivot means connecting said main frame with said subframe being below the axis of said axle.

4. An auto chassis as in claim 3 wherein said brackets are substantially U-shaped with upper and lower legs attached to said subframe connecting plates above and below said pivot means.

* * * * *